Sept. 1, 1925.

J. NAMPLE 1,551,967

FISH SCREENING DEVICE

Filed Jan. 28, 1924     2 Sheets-Sheet 1

WITNESSES

INVENTOR
Joseph Nample,
BY
ATTORNEYS

Sept. 1, 1925.
J. NAMPLE
FISH SCREENING DEVICE
Filed Jan. 28, 1924   2 Sheets-Sheet 2
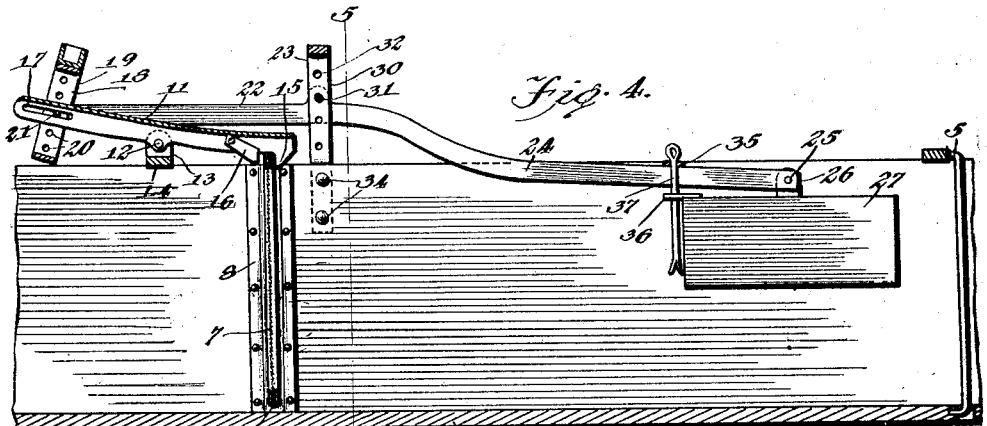
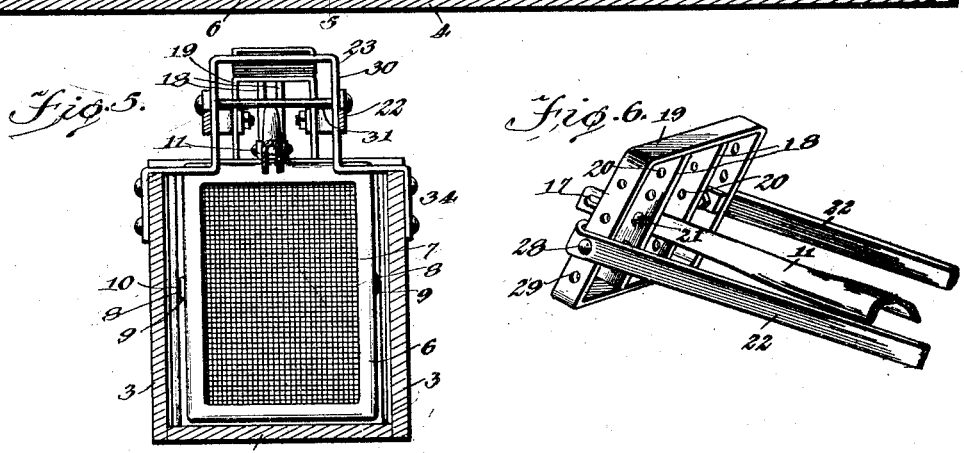
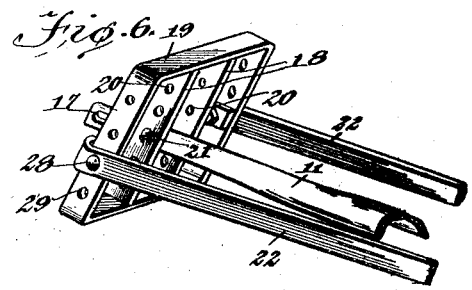
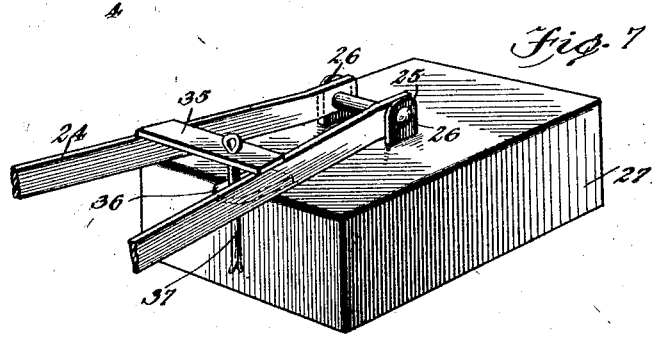
WITNESSES
INVENTOR
Joseph Nample,
BY
ATTORNEYS Patented Sept. 1, 1925.

1,551,967

UNITED STATES PATENT OFFICE.

JOSEPH NAMPLE, OF REICHLE, MONTANA.

FISH-SCREENING DEVICE.

Application filed January 28, 1924. Serial No. 689,135.

*To all whom it may concern:*

Be it known that I, JOSEPH NAMPLE, a citizen of the United States, residing at Reichle, in the county of Beaverhead, State of Montana, have invented certain new and useful Improvements in Fish-Screening Devices, of which the following is a specification.

My invention relates to improvements in fish screening devices, and it consists in the combinations, arrangements and constructions, herein described and claimed.

An object of the invention is to provide a fish screening device which is adapted to be positioned in an irrigation or like conduit and which affords facilities whereby the passage of fish in the conduit may be controlled.

A further object of the invention is to provide a fish screening device of the character described which comprises a screen adapted to be swingingly supported in an irrigation conduit between the side walls of the latter and means responsive to the rise and fall of the liquid in the conduit to control the swinging movement of the screen.

A further object of the invention is to provide a fish screening device of the character described which is self-cleaning and self-setting in that the swingable screen comprised in the device is released by the means which normally hold the screen in closed position when the level of liquid in the conduit in which the screening device is disposed rises above a predetermined level, as because of the accumulation of débris and floating matter at the "up-stream" side of the screen, the screen automatically returning to closed position when the level of liquid in the conduit has been lowered and the holding means for the screen then acting to hold the screen in closed position.

A further object of the invention is to provide a screening device of the character described in which the means for holding the screen normally in closed position may be adjusted at will to be actuated to release the screen when the liquid flowing in the conduit is at any predetermined level within a considerable range.

Figure 1:
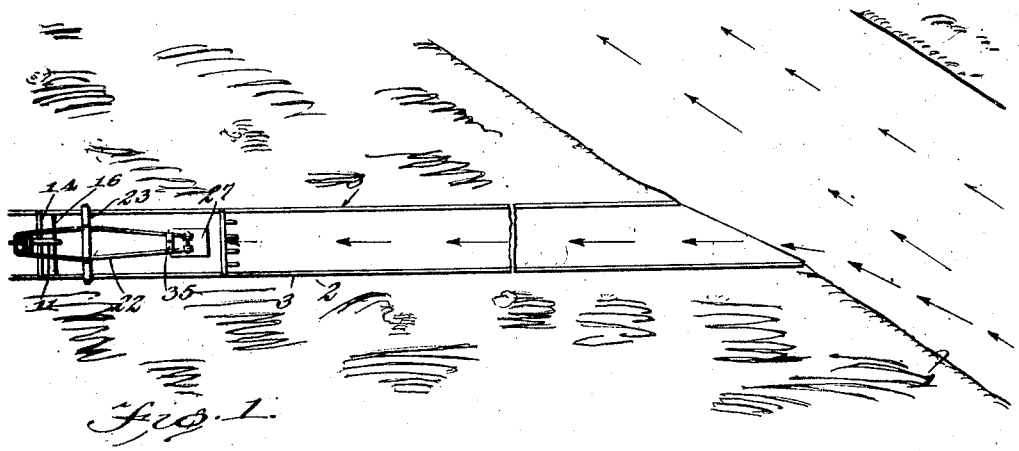
Figure 2:
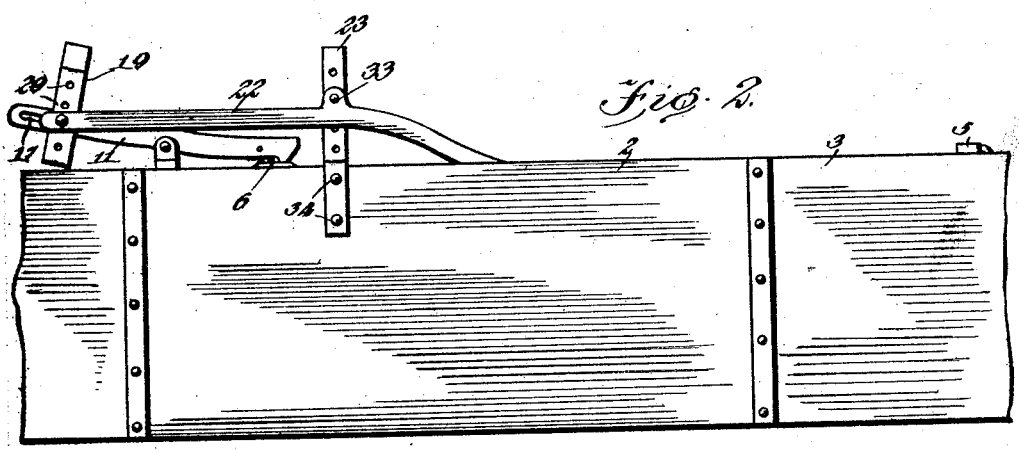
Figure 3:
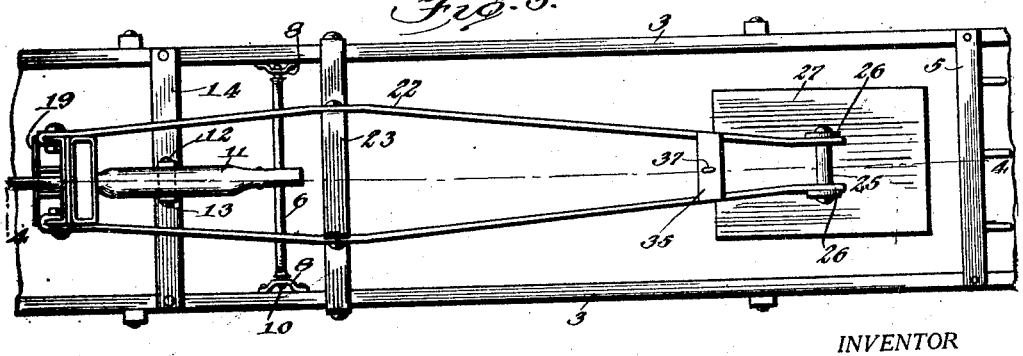

Other objects and advantages will be apparent from the following description considered in conjunction with the accompanying drawings, in which:

Figure 1 is a plan view showing a screening device embodying the invention operatively applied to a conduit, Figure 2 is a side elevation of a fragmentary portion of the conduit, showing the device in applied position, Figure 3 is a plan view of the structure exhibited in Figure 2, Figure 4 is a section along the line 4—4 of Figure 3, Figure 5 is a section along the lines 5—5 of Figure 4, Figure 6 is a relatively enlarged fragmentary perspective view showing a portion of the screen holding mechanism which is comprised in the device, Figure 7 is a view similar to Figure 6 showing a float which is comprised in the device and a portion of the supporting means therefor.

Referring now to the drawings, and particularly to Figure 1 thereof, the numeral 1 designates a main channel or conduit in which a liquid flows and 2 is a branch thereof. The branch conduit 2 may be an irrigation ditch and may have parallel side members 3 which are disposed vertically edgewise and extend along the lateral edges of a bottom 4.

The branch conduit 2 may have a grille 5 positioned therein at a predetermined distance from the juncture of the branch and main conduits. The grille, however, does not prevent the passage of fish in the stream along the conduit. As is well known, branch irrigation conduits frequently become dry during certain seasons of the year and the fish which have traveled from the main conduit along the branch conduit die when the water remaining in the branch conduit is insufficient for their preservation.

My invention provides means for preventing the loss of such fish by preventing the passage of the fish along the branch conduit for any considerable distance from the juncture of the branch conduit and main conduit and for continuously closing the branch conduit to the passage of fish in the stream flowing therein when the level of the stream falls below a predetermined level.

A device embodying the invention preferably is positioned adjacent to the grille 5 and down stream therefrom. My improved screen device in the form now preferred by me includes a screen 6 which comprises a substantially rectangular frame having a body or panel 7 of foraminous material mounted therein. The screen 6 has a height approximately equal to the depth of the branch conduit and a width slightly less than the distance between two upright supporting members 8 which respectively are secured to the sides 3 of the branch conduit in transverse alignment in respect to each other. The side members of the screen frame are enlarged intermediate their length, as indicated at 9. These enlarged portions 9 have horizontal aligned openings through which a horizontal rod 10 extends. The horizontal rod 10 extends transversely of the branch conduit and has the ends thereof fixed in the upright supports 8.

With the arrangement just described, the screen 6 may rotate in the conduit about an axis which is substantially coincident with the transverse axis of the screen and when the screen is vertically disposed, it will practically close the conduit 6 so that objects of any appreciable size cannot pass therethrough with the water which flows in the conduit. Fish are thus prevented from passing any considerable distance in the branch conduit from the main conduit when the screen 6 is in closed position and the device is positioned relatively adjacent to the juncture of the branch conduit and the main conduit.

It is desirable that the screen 6 shall be adapted to open to permit the passage of débris and floating matter with the water flowing in the conduit when such débris and floating matter have collected against the screen at the up-stream side of the latter. It also is desirable that the screen shall be permitted to open when the level of the water which flows in the branch conduit exceeds a predetermined level and that the screen shall be held continuously closed when the level of the water flowing in the branch conduit falls below the determined level. I, therefore, provide means which will be responsive to the rise and fall of water in the branch conduit to control the opening of the screen so that the desirable objects just mentioned may be attained. This screen controlling mechanism comprises an elongated latch 11 which preferably is of inverted U-shape in cross sectional contour and is pivoted intermediate its length, as at 12, between upstanding ears 13 which are formed on a bar 14 extending transversely of the conduit 2 and supported on the sides 3 of the latter. The transverse bar 14 is located on the down stream side of the screen. The latching member 11 thus is supported to swing about a horizontal axis so that one end portion of the latching member may swing to and from position to rest upon the upper edge portion of the screen. This end portion of the latching member is provided with a fixed jaw 15 and a pivoted jaw 16. The pivoted jaw and the fixed jaw depend at opposite sides of the screen at the upper edge of the latter when the latching member is in position to hold the screen closed, the engagement of the pivoted jaw member 16 with the latch member preventing the pivoted jaw member from swinging downward beyond active position but permitting said pivoted jaw member to be swung upwardly against the action of gravity to inactive position, for a purpose to be presently described.

The latching member 11 is provided adjacent to its other end with a slot 17 which extends longitudinally thereof. A pair of spaced-apart vertical bars 18 which are carried by a substantially rectangular frame 19 straddle the second-named or slotted end portion of the latch member 11. The vertical bars 18 are provided with vertical series of spaced-apart openings 20, the corresponding opening of the two bars being horizontally aligned. A pin 21 may be extended through any two aligned openings 20 of the two bars 18 and through the slot of the end portion of the latching member which is received between the bars 18 to pivotally and slidably connect the latching member 11 to the frame 19.

The frame 19 is carried at one end of a lever 22 which is pivotally supported intermediate its length on a yoke or supporting frame 23 carried by the side members 3 of the conduit, the yoke 23 being positioned a slight distance up-stream from the screen 6. The second end portion of the lever 22 is downwardly offset, as indicated at 24, and is pivotally connected adjacent to its extremity, as indicated at 25, to a pair of ears 26 which upstands from a float 27 at the approximate center of the upper wall of the latter.

The particular lever 22 comprises two elongated bar members which straddle the frame 19 and are adjustably connected to the latter by horizontally aligned fastening elements 28 which extend through transverse openings in the lever members and through horizontally aligned openings 29 in the side members of the frame 19, there being a vertical series of the openings 29 in each of the side members of the frame 19. The lever members also straddle the upwardly offset upper portions 30 of the arms of the yoke 23 and are adjustably fulcrumed on the yoke 23 through the agency of a transverse rod 31 which extends through horizontally aligned openings 32 in the inwardly offset portions 30 of the yoke and through transverse openings 33 which are formed in enlargements of the lever members intermediate the length of the latter, there being a plurality of the openings 32 in each of the portions 30 of the yoke and the horizontal rod 31 being removably held against axial displacement from applied position by any suitable known means, as by being provided at one end with a head and being in threaded engagement at its other end with a nut or like retaining element.

The arms of the yoke are rigidly secured adjacent to their extremities to the sides 3 of the conduits by suitable fastening means, as indicated at 34.

The lever members are received at the second-named end of the lever between the ears 26 on the float 27 and are connected to the latter by the hereinbefore-mentioned pivot pin 25. The lever members are stayed to each other adjacent to the last-mentioned end of the lever by a transverse stay member 35. The latter is positioned directly above a laterally extending ear 36 which is provided on the float 27 at one of the free ends of the latter. A vertical retaining member 37 which may be a cotter pin extends through a vertical opening in the stay member 35 and is loosely received in a vertical opening in the ear 36, the guiding and retaining member being of such length as to depend nearly to the plane of the lower side of the float 27 and being provided at its upper and lower ends with enlargements of greater area than the opening in the stay member 35 and the opening in the ear 36, respectively. With this arrangement, the float 27 may have a limited oscillatory motion about the axis of the horizontal pivot member 25 without actuating the lever 22. However, the float is held at all times in such position that it will be partially disposed in underlying relation to an end portion of the lever 22.

From the foregoing description of the various parts of the device, the operation thereof may be readily understood. The float 27 is positioned upstream from the screen 6. The lever 22 and the latching member 11 are connected by the pivot means described with the yoke 23 and the frame 19, respectively, so that the lever 11 will be held in active position or in other words in engagement with the closed screen 6 when the water flowing in the conduit 2 is at a predetermined level. Should the water rise in the conduit for any cause, as for instance, because of the clogging of the stream by an accumulation of floating matter and other débris at the upstream side of the screen, the consequent raising of the float 27 will cause the lever 22 to be actuated in such manner as to swing the latch 11 out of engagement with the screen. The latter then will swing about the axis of the horizontal rod 9 because of the pressure against the screen at the upstream side of the latter, thus permitting the floating matter and other débris to move with the water in the conduit.

The level of the water floating in the conduit will be lowered when the obstruction in the path of the débris has been removed in the manner described, and the float 27 will move downward with the fall of the water so that the latch 11 will be swung to position to engage with the screen 6 as the latter swings back to closed position after the pressure which swung the screen to open position has been removed. The pivoted jaw member 16 is swung upward to permit the screen to return to closed position but will then swing downward by gravity to position to co-operate with the fixed jaw to hold the screen against swinging from closed position until the latch 11 has been operated in the manner described. It thus will be manifest that a screen embodying the invention is self-cleaning as well as self-setting, and that very little, if any, attention need be given to the device after it has been placed in position in a conduit. Should the level of the stream flowing in the conduit be lowered from the predetermined position, the action of the latching member 11 will be such as to tend to prevent the latter from disengaging the screen 6, whereby the latter will be held in closed position.

I claim:

1. A screening device of the character described comprising a screen adapted to be positioned in a conduit to extend transversely of the conduit, said screen being supported upon the side walls of the conduit to swing about a horizontal axis extending transversely of the conduit and located intermediate the upper and lower ends of the screen when the latter is in closed position, an elongated latch member pivotally supported intermediate its length above the conduit and swingable about a horizontal axis extending transversely of the conduit and located at one side of the plane of the screen, said latching member being provided at one end with co-operative spaced-apart jaw members for engaging with opposite sides of the upper edge portion of the screen to hold the screen against swinging from closed position, said latching member having a slot extending longitudinally of the other end portion thereof, a lever fulcrumed intermediate its length to swing about a horizontal axis located at the other side of the plane of said screen, pivot means adjustably connected with said lever at one end of the latter for engaging with the slot in the second-named end of said latching member, and a float depending from the second-named end of said lever and adapted to rest on the surface of a stream of water flowing in said conduit.

2. A screening device of the character described comprising a screen adapted to be positioned in a conduit to extend transversely of the conduit, said screen being supported upon the side walls of the conduit to swing about a horizontal axis extending transversely of the conduit and located intermediate the upper and lower ends of the screen when the latter is in closed position, an elongated latch member pivotally supported intermediate its length above the conduit and swingable about a horizontal axis extending transversely of the conduit and located at one side of the plane of the screen, said latching member being provided at one end with co-operative spaced apart jaw members for engaging with opposite sides of the upper edge portion of the screen to hold the screen against swinging from closed position, said latching member having a slot extending longitudinally of the other end portion thereof, a lever fulcrumed intermediate its length to swing about a horizontal axis located at the other side of the plane of said screen, pivot means adjustably connected with said lever at one end of the screen for engaging with the slot in the second-named end of said latching member, a float depending from the second-named end of said lever and adapted to rest on a surface of a stream of water flowing in said conduit, and co-operative means carried by said lever and said float for limiting swinging movement of said float relatively to the lever and about the axis of the pivotal connection of the float and the lever.

3. A device of the character described comprising a screen adapted to be positioned in a conduit to extend transversely of the latter and to be pivotally supported intermediate its upper and lower ends to swing about an axis extending transversely of the conduit, a pivoted latch member having at one end a fixed jaw and a pivoted jaw adapted to co-operate to hold said screen against swinging from vertical position when said latch is in a certain position, a vertically disposed yoke extending transsersely of the conduit, a lever adjustably and pivotally supported on said yoke to swing about an axis intersecting the lever intermediate the length of the latter, means for adjustably connecting the second-named end of said latching member with the second end of said lever, whereby raising of the other end of said lever will actuate said latching member to effect release of said screen, and a float carried by said lever at its second-named end.

JOSEPH NAMPLE.